J. R. GROVE.
ELECTRIC CHAIN WELDING MACHINE.
APPLICATION FILED JULY 12, 1916.

1,218,397.

Patented Mar. 6, 1917.
3 SHEETS—SHEET 1.

Witnesses
G. E. Dogan
B. Wemberg

Inventor
J. R. Grove.

By Wm. F. Doyle
Attorney

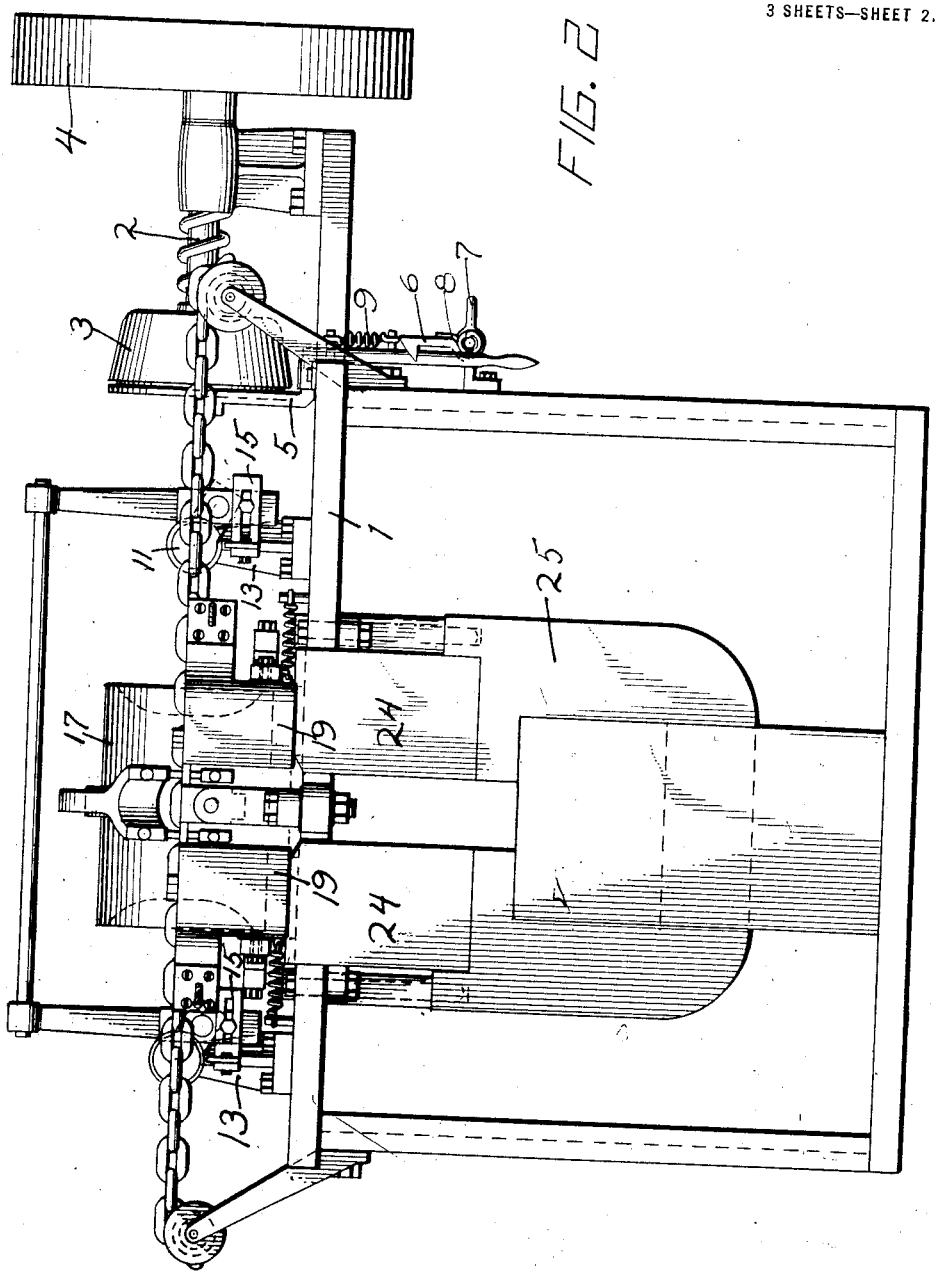

J. R. GROVE.
ELECTRIC CHAIN WELDING MACHINE.
APPLICATION FILED JULY 12, 1916.

1,218,397.

Patented Mar. 6, 1917.
3 SHEETS—SHEET 3.

Witnesses
G. E. Logan
B. Weinburg

Inventor
J. R. Grove
By Wm. F. Doyle
Attorney

UNITED STATES PATENT OFFICE.

JACOB ROSS GROVE, OF YORK, PENNSYLVANIA.

ELECTRIC CHAIN-WELDING MACHINE.

1,218,397. Specification of Letters Patent. Patented Mar. 6, 1917.

Application filed July 12, 1916. Serial No. 108,821.

*To all whom it may concern:*

Be it known that I, JACOB R. GROVE, a citizen of the United States, residing at York, in the county of York, State of Pennsylvania, have invented certain new and useful Improvements in Electric Chain-Welding Machines, of which the following is a description, reference being had to the accompanying drawings, forming a part hereof.

This invention relates to chain welding machines of the type in which the links of a chain, previously formed of unwelded links, are heated by passing an electric current through them and are welded by compression or by compression and swaging.

Various efforts have been made to weld a series of links simultaneously. This has been attempted by means of employing a current of the voltage usually employed in welding a single link, multiplying the amperes used in welding a single link by the number of links. The unsuccessful result has been owing to the fact that the resistance of the several links in parallel varies, that of one link being much greater than another. Also the resistance of the contacts between the electrodes and the several links varies in even greater proportion so that the result has been some links have been heated excessively and other links insufficiently. In my mechanism, I design to heat the links in electric series. In order to do this, I employ a current having the same number of amperes as the current usually employed for heating a single link, but multiply the number of volts employed by the number of links to be welded, so that irrespective of the variations in the resistance of the links or the variations in the resistance of the contacts, each link receives exactly the same amount of current as each other link and heats to the same temperature. The current traverses the plurality of links successively and brings same to a uniform temperature for the reason that the amount of current that is released through the outgoing electrode is the amount of current that passes through each link.

An object of the invention is to provide a machine of this type whereby, simultaneously, a plurality of links proximate in the same axial plane may be heated and welded.

A further object is to provide coöperating welding jaws and swaging hammers in operative relation therewith, whereby, simultaneously, links proximate in the same axial plane may be heated and welded.

A further object is to provide coöperating welding jaws whereby, simultaneously, links proximate in the same plane may be heated and compressed.

A further object is to provide hammers adapted to swage simultaneously, a plurality of links proximate in the same axial plane.

A further object is to provide a stationary welding jaw adapted to coöperate with two movable jaws whereby simultaneously two links in the same axial plane may be heated and compressed.

A further object of the invention is to provide a machine of this type whereby simultaneously a series of links may be heated, by passing electric current through them in electric series, and welding by compression or by compression and swaging.

Other and further objects and advantages of the invention will be hereinafter set forth and the novel features thereof defined by the appended claims.

In the drawings,

Fig. 2 is a front elevation of the parts shown in Fig. 1.

Similar numerals of reference indicate corresponding parts in all the views of the drawings.

Figure 1:
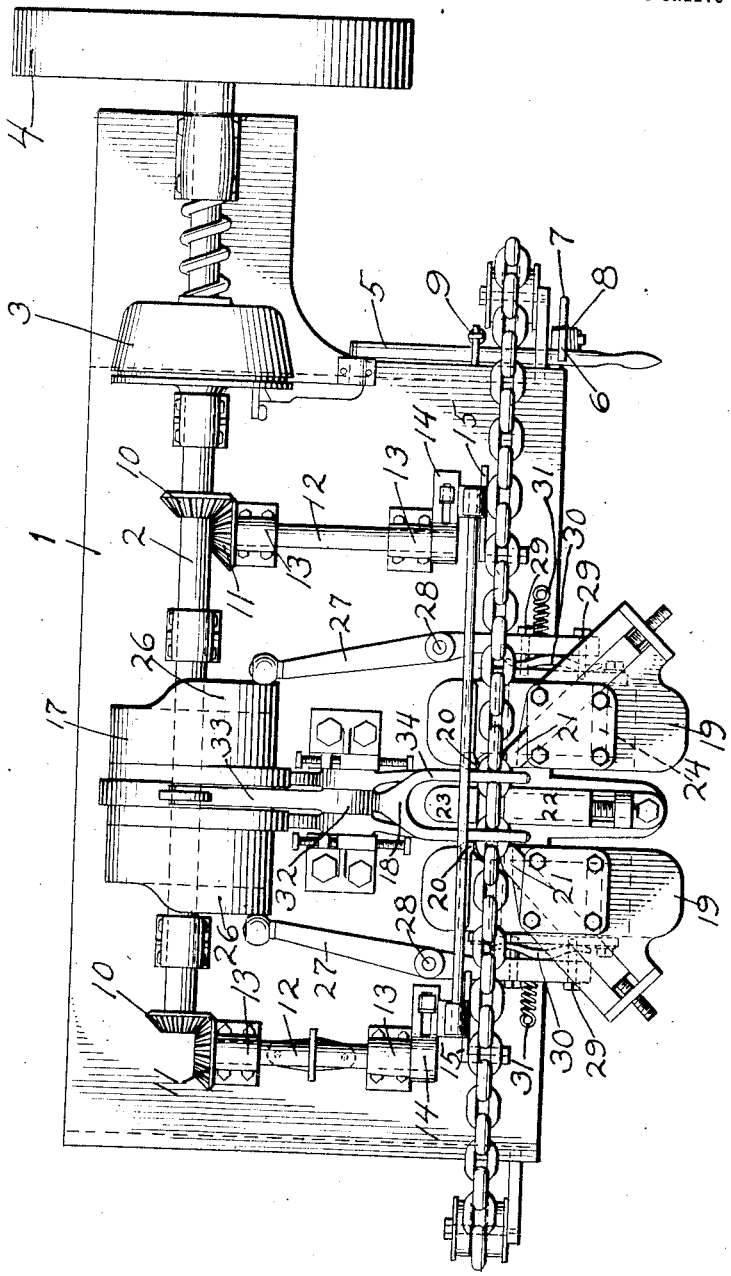
Figure 1 is a plan view of my improved electric chain welding machine.

Reference now being had to the drawings by numerals, 1 indicates the table on which the several parts of the mechanism are mounted, 2 is a power shaft provided with a friction clutch 3 to make and break the connection between the main shaft 2 which operates the chain welding mechanism and that portion thereof on which is mounted the belt pulley 4. A clutch operating lever 5 is provided, as shown, said lever being adapted when depressed at its outer end to force the clutch members together and to operate the parts of the machine.

In the ordinary operation of machines of this character, it has been found necessary that the attendant maintain his grasp on the friction clutch lever so that in the event that a link should be seated in a faulty manner, said lever may be raised and the machine stopped while the operator tapped said faulty seated link into place when the machine is again started.

With the improved mechanism, as shown in this application, the arrangement of the seats which receive the links is such as to insure against any faulty seating and therefore a locking mechanism is provided to maintain the lever 5 in its depressed position or the position in which the parts of the welding machine are operated. A spring dog 6 is mounted on the frame of the machine in such a position as to engage over the top of the lever 5 when in its depressed position. Said dog is provided with an extension 7 which may be depressed and the dog withdrawn against the tension of the spring 8 and engagement with the lever, thereby releasing said lever allowing it to automatically stop the machine. A spring adapted to elevate the lever and release the clutch is shown at 9.

The power shaft 2 is provided with bevel gears 10 meshing with bevels 11 mounted on counter shafts 12, suitably mounted in bearings 13, said shafts 12 carrying at their forward ends the chain feed levers 14; arms 15 are adjustably mounted thereon in such a manner that projecting pin 16 mounted thereon may be brought into the proper position to contact with a horizontal link between the ends of two vertically arranged links.

Mounted on the power shaft is the cam 17 adapted to operate swaging hammers 18 and the welding jaws 19.

The jaws above referred to are provided with link seats or rests 20, against which the rear of one of the links to be welded rests, said rest being in line with the greatest width of the link and is adapted to receive the backward thrust of the link only, any movement of the rest longitudinally of the chain merely sliding along the outer longitudinal surface of the link.

Said jaws 19 are further provided with the electrodes 21, which also act as the compressing member for the link to force the ends thereof together when being welded. The jaws are so located that a stationary central jaw or electrode 22 may be located, there being a corresponding centrally located rear rest or seat 23.

The central electrode or jaw 22 is of the same material as electrodes 21, it being a good conductor of electricity, and is so formed that its inner end forms the inner seat or abutment jaw for the inner ends of two links, said stationary central jaw forming a perfect electrical contact and abutment against which the longitudinal thrust of the movable jaws 19 is received, but the corresponding central rest or seat 23 is so shaped that it corresponds somewhat to the rests 20, in that it receives no longitudinal thrust of the link, but only the rear or transverse thrust of the links when the jaws 19 are operated.

Jaws 19 are slidably mounted in suitable ways 24 formed in the upper ends of the secondary coil 25 of the transformer, said sliding contact between the jaws 19 and the transformer being the electrical contact between these parts, the current being admitted through one jaw 19 and its electrode through one of the links. From said link the current passes through the link and produces the weld therein, from thence out into the central stationary jaw 22, across and into the second link, through it, performing the same duty as before, and then out through the other electrode carried by the other movable jaw 19.

Side cams 26 control the inner ends of jaw operating levers 27 pivoted at 28 on the table, and provided with suitable insulated spring connection with the jaws at their outer ends. Bolts 29 pass loosely through the outer end of levers 27 and into the jaws, and openings 30 are interposed between the lever and the blocks. Said construction insures a perfect contact between the jaws and the links on a slightly varying size of links. Retracting springs 31 are attached to the jaws and secured on the table to return jaws 19 to their open position.

The swaging hammers 18 are pivoted for vertical movement at 32 and consist of an upper and a lower member having rearwardly extending arms 33 and forwardly extending arms 34, said forwardly extending arm being bifurcated and provided with heads 35 at their extreme outer ends adapted to come in contact with the portion of the two links to be welded and control the burr thereon when the ends of the links are forced together during the welding operation.

Figure 4:
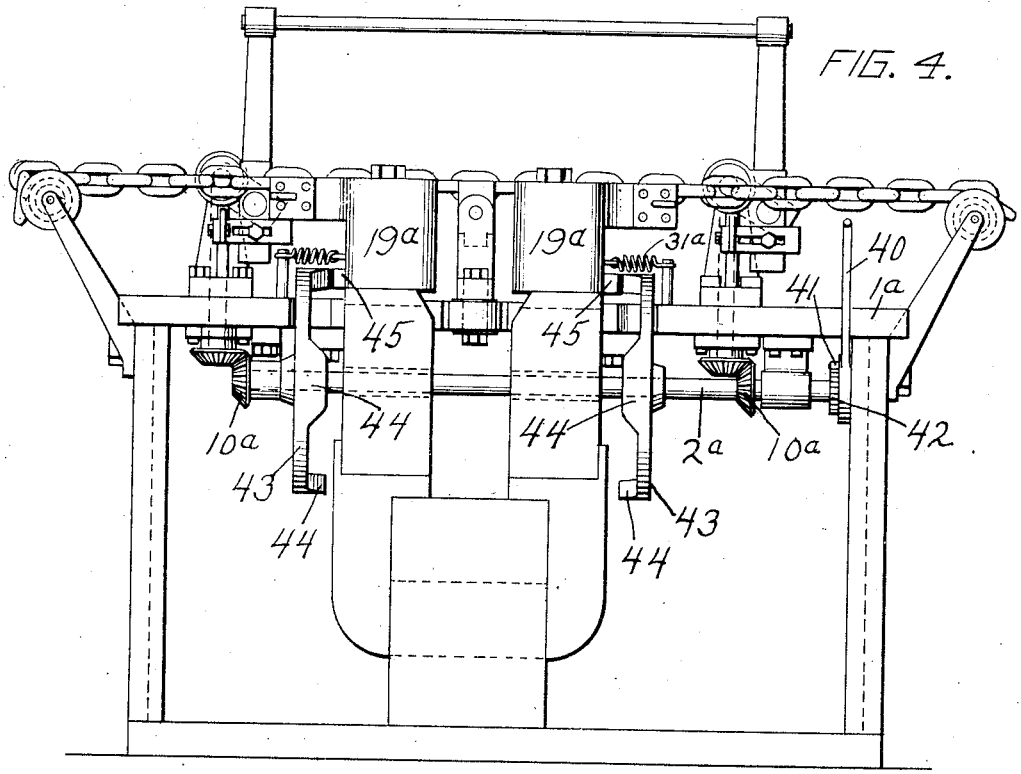
Fig. 4 is a top plan view of a slightly modified form of electric welding machine.
Figure 3:
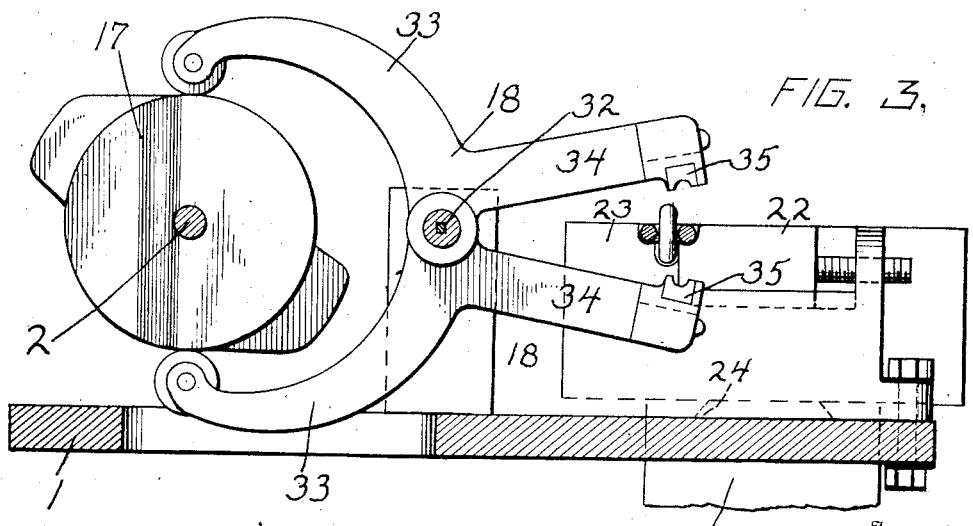
Fig. 3 is a vertical section to show more clearly the intermediate stationary jaw.

In the modified form of the machine shown in Fig. 4, the power shaft 2ª is mounted beneath the table 1ª and power therefrom is directed through bevels 10ª to operate the chain feed.

A power lever adapted to give the shaft 2ª a one-quarter turn is shown at 40, said lever being mounted loosely on the shaft and provided with a dog 41 in contact with a ratchet wheel 42 rigidly secured to the shaft.

Jaws 19ª are mounted in a manner similar to that shown in my preferred form, but in place of the operating levers 27 for the movement of the jaws cam wheels 43 are provided having projections 44 arranged around the inner side face of its periphery and adapted to contact with lugs 45 on jaws 19ª and give them the proper welding movement.

The central jaw or electrode is the same in this form of machine as in my preferred form. There are no swaging hammers shown, as this machine is intended to show a hand operated mechanism adapted to produce a rough link.

Springs 31ª are adapted to return the jaws to their retracted positions after being released by cams 43.

Special thought has been applied to the form of seats in which the links are adapted to rest, and the movement of the jaws, with a view of speeding the machine and removing the necessity so frequently found in machines of this character for stopping the machine to adjust the link, and it has been with this in view that the sliding jaws have been provided, whereby the movement may be increased to a point to provide ample space into which the links may fall to place, yet avoid therein the swing of the jaws out of line when same are pivoted.

By means of the sliding jaws a difficulty inherent in the pivoted jaws, which consists in the links being raised in front occasionally when they are not properly formed so that they fail to form a good contact, is avoided. A sliding movement of the jaws insures a pressure on the links in line with the axis thereof, and no difficulty is met in making contact.

What I claim is:—

1. In an electric chain welding machine, coöperating welding jaws and swaging hammers in operative relation therewith, whereby simultaneously a plurality of links proximate in the same axial plane of the chain may be heated and welded.

2. In an electric chain welding machine, a set of coöperating welding jaws, comprising a stationary median jaw and two lateral movable jaws, one on each side thereof whereby simultaneously two links proximate in the same axial plane of the chain may be heated and compressed.

3. In an electric chain welding machine, a set of coöperating welding jaws comprising a stationary median jaw and two movable jaws, one on each side thereof adapted to engage heat and compress two links proximate in the same axial plane of the chain simultaneously, one link between each of the movable lateral jaws and the median stationary jaw.

4. In an electric chain welding machine, a set of coöperating welding jaws comprising a stationary median jaw and two movable jaws, one on each side thereof, adapted to engage heat in electric series, and compress two links proximate in the same axial plane of the chain simultaneously, one link between each of the movable lateral jaws and the median stationary jaw.

5. In an electric chain welding machine, a set of coöperating welding jaws comprising a median jaw and two lateral jaws; each lateral jaw in operative electric connection with one side of the welding circuit, and in operative connection with the other side in series with the median jaw, and with a chain link between said lateral jaw and said median jaw, and with a chain link between the median jaw and the opposite lateral jaw.

6. In an electric chain welding machine, a welding jaw adapted to engage two links one on either side of it in the same axial plane of the chain, in coöperation with jaws lateral thereto.

7. In an electric chain welding machine, a welding jaw adapted to engage one link on either side of it both in the same axial plane of the chain.

8. In an electric chain welding machine, a pair of coöperating hammers adapted to swage simultaneously two links proximate in the same axial plane of the chain.

9. In an electric chain welding machine, a set of coöperating welding jaws, comprising spaced movable jaws and an intermediate jaw for engagement with interposed chain links, and an electric circuit including said jaws and the intermediate jaw and interposed links.

10. In a chain welding machine, terminal and intermediate link engaging jaws and an electric circuit including the same.

11. In a chain welding machine, terminal and intermediate link engaging jaws and an electric circuit including the same through the links.

12. In a chain welding machine, terminal and intermediate link engaging jaws and an electric circuit including the same through the links, one of said jaws being movable axially of the links.

13. In a chain welding machine, terminal and intermediate link engaging jaws and an electric circuit including the same through the links, the terminals being movable axially of the links.

14. In an electric chain welding machine adapted for simultaneously welding a series of links, a set of welding jaws, comprising one or more stationary jaws and two or more sliding jaws, each jaw presenting one or more electrodes projecting into the axial plane of the links to be welded and one or more rests adapted to receive and sustain the links in welding position, these rests being so located as not to impede the forward or backward movement of the links to be welded.

15. In an electric chain welding machine, an electrode having means for contacting electrically with two links simultaneously.

16. In an electric chain welding machine, an electrode having means for contacting with two links in electric series.

17. The method of simultaneously welding a plurality of chain links which consists in connecting them in series in an electrical circuit including electrodes contacting with the terminal links, and compressing the links.

This specification signed and witnessed this 8th day of July, A. D. 1916.

JACOB ROSS GROVE.

In the presence of
 URBAN S. BOND,
 LYDIA HERMAN.